V. C. FREEMAN.
SUPPORTING DEVICE FOR FRUIT PROTECTING ENVELOPS.
APPLICATION FILED AUG. 5, 1909.
946,897.
Patented Jan. 18, 1910.
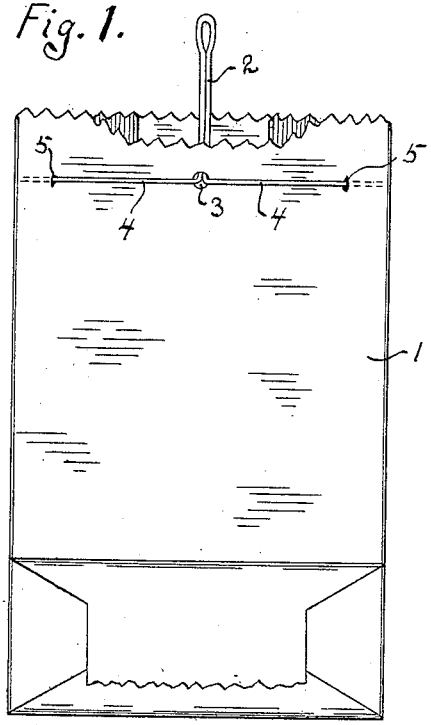
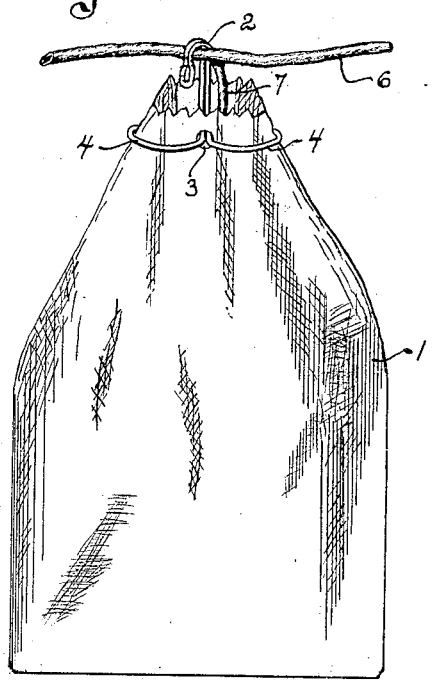
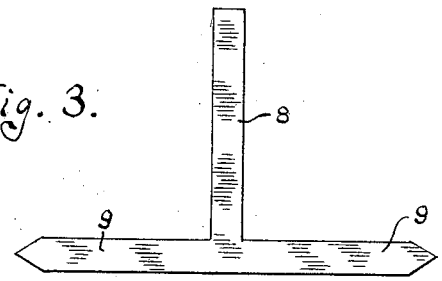
Witnesses.
Frank W. Haskell.
Millard Haskell.
Inventor.
Vernon C. Freeman,
By Walter N. Haskell.
his Attorney.

UNITED STATES PATENT OFFICE.

VERNON C. FREEMAN, OF ROCK FALLS, ILLINOIS, ASSIGNOR OF ONE-HALF TO JOHN W. MARTIN AND DAVID L. MARTIN, OF STERLING, ILLINOIS.

SUPPORTING DEVICE FOR FRUIT-PROTECTING ENVELOPS.

946,897. Specification of Letters Patent. Patented Jan. 18, 1910.

Application filed August 5, 1909. Serial No. 511,473.

*To all whom it may concern:*

Be it known that I, VERNON C. FREEMAN, a citizen of the United States, residing at Rock Falls, in the county of Whiteside and State of Illinois, have invented certain new and useful Improvements in Supporting Devices for Fruit-Protecting Envelops; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to supporting devices for fruit protecting envelops, and aims to provide a simple and convenient means for holding such envelop in position on the vines. In the cultivation of grapes more especially, it has become common to protect the maturing bunches of fruit from the ravages of insects or other enemies of the fruit by inclosing each of the bunches separately in a paper sack, or other envelop, the mouth of the receptacle being then closed and fastened about the stem of the bunch. The fastening is usually accomplished by means of a pin or piece of string, and where a large number of bunches of fruit are inclosed, the operation is somewhat laborious, occasioned largely by the necessity of handling the fastening means separately from the envelop, and attaching the same thereto when it is in position.

My device is designed to be attached to the sacks, in quantities, ready to be secured to the vines. The construction and method of using the same will more fully appear from the following specification, reference being had to the drawings accompanying the same, wherein—

Figure 1 shows my invention attached to the envelop, ready for use. Fig. 2 shows the same in position on the vine. Fig. 3 illustrates a modified form of the device.

1 represents an ordinary paper sack, in the usual shape that such sacks are in when being transported or stored, and 2 is a loop or tongue, formed of a double wire, the lower end of such loop passing through an opening 3 in the sack, and projected at right angles in opposite directions into arms 4, the ends of which are inserted through the sack 1, as at 5.

The device is preferably formed of flexible metal, and in use the envelop 1 is slipped upwardly over the fruit until such fruit is entirely concealed therein. The loop 2 is then bent over the branch 6 from which the fruit depends, (Fig. 2) and the upper end of the sack folded or gathered about the loop 2 and stem 7 of the fruit, protecting the same from above. As the mouth of the envelop is folded the arms 4 are bent therewith, holding the same in place.

The sacks can be provided with the supporting means herein described when such sacks are in process of manufacture, and for the purpose of transportation or storage the tongue 2 can be turned downwardly into the sack, and out of the way. The bars 4 not only prevent the loop 2 from slipping downwardly through the aperture 3, but they also hold it in position at right angles to the top of the sack, and conveniently for use.

It will be obvious that after the fruit is inclosed by the receptacle and the loop 2 secured to the branch above such fruit, both hands of the operator will be free to close up the upper end of the sack, which can thus be quickly accomplished.

Fig. 3 shows a modification of the device, which is formed of sheet-metal and comprises a tongue 8, corresponding with the loop 2, and arms 9 integral therewith, and provided with pointed ends adapted to be inserted in the side of the sack, and clenched on the inner side thereof. The use of the modified form of the invention is similar to that hereinbefore described. It is possible to deviate in other ways from the exact form or manner of construction of my device without departing from the spirit thereof.

What I claim as my invention, and desire to secure by Letters Patent of the United States, is:

A flexible loop, adapted to be attached to the branch of a tree or vine immediately above the fruit thereon, and flexible arms integral with said loop, projected oppositely therefrom, and adapted to be inserted in the upper part of a fruit envelop.

In testimony whereof, I affix my signature, in presence of two witnesses.

VERNON C. FREEMAN.

Witnesses:
A. K. HABERER,
W. N. HASKELL.